United States Patent [19]
La Trobe

[11] Patent Number: 5,996,136
[45] Date of Patent: Dec. 7, 1999

[54] TOILET

[75] Inventor: Brian E La Trobe, Johannesburg, South Africa

[73] Assignee: Clevedon Invetments Limited

[21] Appl. No.: 09/081,404

[22] Filed: May 19, 1998

[30] Foreign Application Priority Data

May 20, 1997 [ZA] South Africa .......................... 97/4355

[51] Int. Cl.⁶ .................................................. A47K 11/02
[52] U.S. Cl. .......................................... 4/449; 4/DIG. 12
[58] Field of Search .................................. 4/DIG. 12, 449

[56] References Cited

U.S. PATENT DOCUMENTS

| | | | |
|---|---|---|---|
| 3,921,228 | 11/1975 | Sundberg | 4/131 |
| 4,001,108 | 1/1977 | Hellqvist | 210/12 |
| 4,196,477 | 4/1980 | Stewart | 4/111.1 |

FOREIGN PATENT DOCUMENTS

| | | |
|---|---|---|
| 575176 | 7/1988 | Australia . |
| 644906 | 10/1927 | France . |
| 301881 | 2/1917 | Germany . |
| 1034650 | 6/1966 | United Kingdom . |
| 942598 | 2/1995 | United Kingdom . |

*Primary Examiner*—Robert M. Fetsuga
*Attorney, Agent, or Firm*—Christie, Parker & Hale, LLP

[57] ABSTRACT

An aerobic digestion toilet having a toilet bowl supported to discharge into a chamber with means for inducing a convection air flow through the toilet and a tiltable closure member for the toilet bowl outlet operable from adjacent the toilet seat and biased towards the closed position of the toilet bowl outlet and including means for moving deposited feces within the chamber operable in unison with the closure member designed in such a manner as to produce early separation of urine from the faeces.

9 Claims, 1 Drawing Sheet

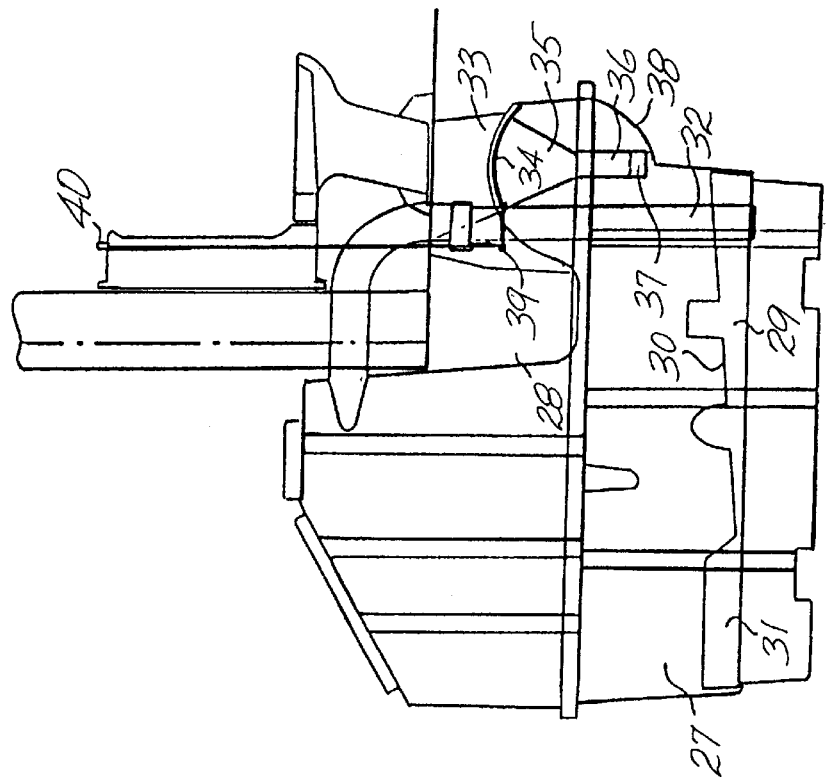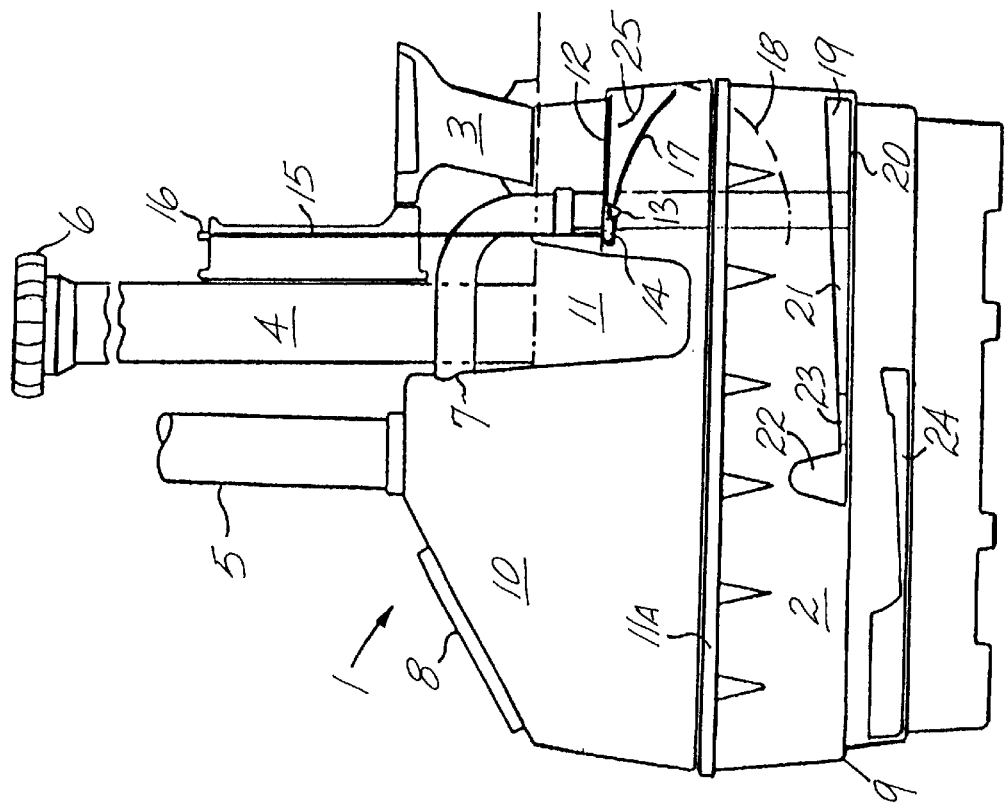

ic
TOILET

FIELD OF THE INVENTION

This invention relates to a toilet which provides aerobic digestion of primary sewage.

The present invention provides a toilet which will ensure proper digestion of the sewage and keep costs of manufacture low.

SUMMARY OF THE INVENTION

According to this invention there is provided an aerobic digestion toilet comprising a toilet bowl above a chamber and means for inducing convection flow through the chamber from adjacent the floor thereof to an outlet vent, at least one collection tray below the toilet bowl, a closure member for the outlet from the toilet bowl tiltable from adjacent the toilet bowl seat to open the outlet from the toilet bowl and means for moving deposited faeces in the chamber away from the toilet bowl outlet in unison with movement of the closure member.

Further features of this invention provide for the closure member and movement means to be pivotally mounted with the closure means biased towards closure of the toilet bowl outlet, for the closure means to be linked to a manipulating handle located above and behind the toilet bowl, for the closure means to be mounted between a pair of pivotally supported arms carrying the movement means to be movable along an arcuate path below the toilet bowl outlet and for the arms to be extended on the opposite side of the pivot to the closure member and weighted to bias the closure member to close the toilet bowl outlet.

Still further features of this invention provide for a tray to be included in the chamber below the toilet bowl outlet having a surface inclined downwardly away from the toilet bowl outlet and for the tray to be in two sections stepped downwardly along its length from below the toilet bowl outlet.

The invention also provides for the chamber to be made in two parts with a base in the form of a shell moulded in suitable plastics material to have longitudinally extending side supports for the tray parallel to the bottom of the tray and a cover including a panel to generate heat in the chamber when subjected to sunlight.

BRIEF DESCRIPTION OF THE DRAWINGS

These and other features of this invention will become apparent from the following description of preferred embodiments wherein reference is made to the accompanying diagrammatic drawings. FIGS 1 and 2 of the drawings show side elevations of different embodiments.

DETAILED DESCRIPTION WITH REFERENCE TO THE DRAWINGS

Referring to FIG. 1 the toilet (1) has a chamber (2) the lower part of which is sunk below ground level. A toilet bowl (3) is provided above the chamber and housed in a suitable enclosure indicated at (4) by one wall thereof.

An outlet vent in the form, preferably, of an elliptical and or round cross-sectioned black plastics material pipe (5) has a wind turbine (6) at its upper end. This pipe (5) when exposed to sunlight generates radiant heat within the vent resulting in upward flow of gas from the chamber (2) to atmosphere. An air inlet (7) opens from atmosphere into the lower regions of the chamber (2).

The chamber (2) has a manhole and manhole cover (8) to allow access into the chamber. The cover is also made as a panel of heat absorbent material to increase the radiant heat generated in the chamber. Preferably the walls of the chamber will include integral steps to facilitate access into the chamber.

The chamber (2) can be a built-in structure of bricks or blocks but is preferably moulded in suitable plastics material.

Preferably the chamber (2) is moulded in two parts with the base (9) sunken below ground level and the cover (10) extending above ground level.

The cover (10) of the chamber (2) has a transverse trough (11) which is provided to accommodate the foundation for the wall (4). This is useful in sub-economic building schemes where it is desirable to install the toilet prior to building the remainder of the houses.

The chamber is divided into the two parts which are joined along the flange line indicated at (11A) with the bottom edge of the cover (10) nesting along the top edge of the base (9).

A pivoted closure plate (12) is mounted to keep the outlet from the toilet bowl normally closed. The plate (12) is pivoted at (13) and carries an extension (14) on the opposite side of the pivot (13) to the plate (12).

Extension (14) is connected to a vertically supported rod (15) terminating in an operating handle (16) located above and behind the toilet bowl (3).

It should be noted that the plate (12) could also be made to move into the open position when pressure is applied to the seat for the toilet bowl.

Also pivoted at (13) to move in unison with the plate (12) are a series of blades (17) which move to follow an arcuate path indicated at (18). The lowest point of the arcuate path of the blades is a small distance above a tray (19) which extends from the front of chamber (2) to beyond the midpoint of the chamber. The raw sewage is deposited through the toilet bowl onto this tray (19). It will be appreciated that movement of the blades (17) will propel accumulated sewage down the tray (19).

The chamber (2) is, as stated, preferably moulded from suitable plastics material and has side tray supports (20) which are moulded as part of the chamber (2).

The tray (19) has side bearers (21) which engage the tray supports (20) and brace the walls of the chamber (2) against inward collapse. The bearers are tapered so that when engaged on supports (20) the surface of tray (19) is inclined downwardly towards the rear of the chamber. A barrier (22) is formed across the tray (19) at its free end and an aperture (23) is provided through the tray adjacent the barrier.

A second tray (24) extends from the rear of chamber (2) to below the aperture (23) and tray (24) is similarly inclined parallel to tray (19).

A urine trough (25) extends below and across the front of the toilet bowl outlet and can be connected to a suitable disposal outside of the chamber. This is particularly advantageous where a series of toilets are provided such as at schools or other public gathering places. The urine separated from the other raw sewage can be led from the chamber for disposal or can be separately subjected to the heat and digestion within the chamber.

In use raw sewage is deposited into the chamber through the toilet bowl where it is subjected to aerobic digestion by the induced convectional flow of air through the chamber.

As repeated use of the toilet takes place the previously collected faeces is moved along the tray (19). Much of this faeces is digested while deposited on the tray (19). As the material accumulates on tray (19) it tends to fall naturally down the length of the tray and eventually through the aperture (23) onto tray (24). At this stage digestion is virtually complete and very little of the original faeces remains.

The rotational movement of the blades (17) assists in the movement of the faeces as it accumulates on tray (19) where it is urged by the blades down the length of the tray and subjected to aeration.

When eventually there is an accumulation of consequence on the tray (24) it is removed through a manhole indicated at cover (8).

FIG. 2 shows a modification to the toilet described above. In this embodiment the chamber (27) is again moulded from plastics material and includes a trough (28) to accommodate a wall foundation and the construction is generally similar to that of FIG. 1. However the chamber has only a single tray (29) which is supported in a similar manner to that of FIG. 1 to have a downwardly sloping surface (30). This surface terminates in a collection box (31). The surface (30) and box (31) are perforated to permit the circulation of air therethrough.

The ventilation pipe (32) extends from outside the toilet to below the tray (29).

The closure for the toilet outlet (33) is in the form of a curved plate (34) carried between pivotally mounted side arms (35). These arms have extensions (36) on the opposite side of the pivot and the extensions carry a weighted scraper plate (37) which acts to bias the plate (34) to the position illustrated closing the outlet from the toilet.

The wall of the chamber at (38) and the opening of the toilet outlet (33) are curved and arranged to be closely adjacent the path of movement of the plates (34) and (37). Thus with movement of these plates around the pivot for the arms any faeces deposited on the plate (34) or curved wall (38) of the chamber will be scraped off and fall onto the tray (29).

Movement of the arms (35) is effected through a suitable linkage indicated at (39) and terminating in a manipulating handle (40) located above and behind the toilet bowl.

The embodiments described have been found to be effective in use and the construction of FIG. 2 is compact and requires less excavation to house the lower part of the chamber than that shown in FIG. 1. Adequate aeration and digestion of faeces is nevertheless achieved.

It will be appreciated that the construction above described lends itself to inexpensive manufacture and easy installation.

What I/we claim as new and desire to secure by letters patent is:

1. An aerobic digestion toilet comprising:
   a chamber;
   a toilet bowl above the chamber, the toilet bowl having an outlet;
   means for generating radiant heat in the chamber to induce convection flow through the chamber from adjacent the floor thereof to an outlet vent from the chamber;
   at least one collection tray having one end below and spaced apart from the toilet bowl outlet;
   a closure member for the outlet from the toilet bowl tiltable from adjacent the toilet bowl to open the outlet from the toilet bowl; and
   means for moving feces deposited through the toilet bowl onto the collection tray along the tray within the chamber operable in unison with the closure member.

2. An aerobic digestion toilet as claimed in claim 1 in which the closure member and movement means are pivotally mounted and the closure means biased towards closure of the toilet bowl outlet.

3. An aerobic digestion toilet as claimed in claim 2 in which the closure means is linked to a manipulating handle located above and behind the toilet bowl.

4. An aerobic digestion toilet as claimed in claim 1 in which the collection tray has a surface inclined downwardly across the chamber away from the toilet bowl outlet.

5. An aerobic digestion toilet as claimed in claim 4 in which the tray is in two sections stepped downwardly along its length away from the toilet bowl outlet.

6. An aerobic digestion toilet as claimed in claim 1 in which the chamber is made in two parts with a base in the form of a shell molded in suitable plastics material to have longitudinally extending side supports for the tray parallel to the bottom of the tray and an opening in the top of the tray with a cover including a panel to generate heat in the chamber when subjected to sunlight.

7. An aerobic digestion toilet as claimed in claim 6 in which the tray is shaped to incline downwardly when mounted on the side supports and to brace the sides of the chamber against inward flexing.

8. An aerobic digestion toilet as claimed in claim 1 in which the cover of the chamber includes a trough to accommodate a wall for surrounding the toilet bowl assembly.

9. An aerobic digestion toilet as claimed in claim 1 in which the toilet bowl includes a urinal trough to assist in use, separation of the urine from the feces.

* * * * *